United States Patent
Lee et al.

(10) Patent No.: US 11,821,846 B2
(45) Date of Patent: Nov. 21, 2023

(54) FOCUS-LESS INSPECTION APPARATUS AND METHOD

(71) Applicant: KOH YOUNG TECHNOLOGY INC., Seoul (KR)

(72) Inventors: Chan Kwon Lee, Ansan-si (KR); Moon Young Jeon, Seongnam-si (KR); Jung Hur, Bucheon-si (KR); Deok Hwa Hong, Gwangmyeong-si (KR); Eun Ha Jo, Gwangmyeong-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 9 days.

(21) Appl. No.: 17/735,521

(22) Filed: May 3, 2022

(65) Prior Publication Data

US 2022/0260503 A1    Aug. 18, 2022

Related U.S. Application Data

(63) Continuation of application No. 17/123,901, filed on Dec. 16, 2020, now Pat. No. 11,360,031, which is a
(Continued)

(30) Foreign Application Priority Data

Oct. 15, 2018 (KR) .......... 10-2018-0122354
Dec. 12, 2018 (KR) .......... 10-2018-0159872

(51) Int. Cl.
*G01N 21/95* (2006.01)
*G01N 21/47* (2006.01)

(52) U.S. Cl.
CPC ..... *G01N 21/9501* (2013.01); *G01N 21/4738* (2013.01)

(58) Field of Classification Search
CPC .......... G01N 21/9501; G01N 21/4738; G01N 2021/8829; G01N 2021/95638;
(Continued)

(56) References Cited

U.S. PATENT DOCUMENTS 7,061,628 B2 *  6/2006  Franke .............. G01B 11/2504
                                            356/604
8,224,066 B2     7/2012  Haeusler
(Continued)

FOREIGN PATENT DOCUMENTS

EP    2 500 687    9/2012
EP    2 565 697    3/2013
(Continued)

OTHER PUBLICATIONS

Extended European Search report corresponding to European Application No./Patent No. 19203002.1, dated Mar. 19, 2020.
(Continued)

*Primary Examiner* — Roy M Punnoose
(74) *Attorney, Agent, or Firm* — KILE PARK REED & HOUTTEMAN PLLC

(57) ABSTRACT

An inspection apparatus may include: a structured-light source configured to sequentially radiate a plurality of structured lights having one phase range; a lens configured to adjust, for each of the plurality of structured lights, optical paths of light beams corresponding to phases of the phase range such that a light beam corresponding to one phase of the phase range arrives at each point of a partial region on an object; an image sensor configured to capture a plurality of reflected lights generated by the structured lights being reflected from the partial region; and a processor configured to acquire a light quantity value of the reflected lights; and
(Continued)

derive an angle of the surface by deriving phase values of the reflected lights based on the light quantity value for the reflected lights.

10 Claims, 10 Drawing Sheets

Related U.S. Application Data continuation of application No. 16/653,291, filed on Oct. 15, 2019, now Pat. No. 10,890,538.

(58) Field of Classification Search
CPC ..... G01N 2021/95646; G01N 21/8806; G01B 11/26; G01B 11/25; H01L 22/12; H01L 22/30; H01L 27/14627; H01L 27/14629; G01J 1/02; G02B 5/30
See application file for complete search history.

(56) References Cited

U.S. PATENT DOCUMENTS

| | | | |
|---|---|---|---|
| 10,890,538 B2* | 1/2021 | Lee | G01N 21/9501 |
| 11,360,031 B2* | 6/2022 | Lee | G01N 21/8806 |
| 2003/0058454 A1 | 3/2003 | Scheiner | |
| 2003/0179373 A1 | 9/2003 | Magnusson et al. | |
| 2007/0115482 A1 | 5/2007 | Harding et al. | |
| 2010/0328649 A1* | 12/2010 | Ota | G01B 11/25 356/612 |
| 2011/0194121 A1* | 8/2011 | Ertl | A61B 5/0088 356/610 |
| 2012/0327400 A1 | 12/2012 | Ota et al. | |
| 2015/0260510 A1 | 9/2015 | Nakajima | |
| 2017/0122731 A1 | 5/2017 | You et al. | |
| 2018/0040118 A1 | 2/2018 | Seo et al. | |
| 2018/0080766 A1* | 3/2018 | Johnson | G01C 3/08 |
| 2018/0263482 A1* | 9/2018 | Guan | F21V 14/04 |
| 2021/0095956 A1* | 4/2021 | Preisinger | B21D 5/006 |

FOREIGN PATENT DOCUMENTS

| | | |
|---|---|---|
| JP | 9-36036 | 2/1997 |
| JP | 2008-164324 | 7/2008 |
| JP | 2011-7576 | 1/2011 |
| JP | 2021-47211 | 3/2021 |
| KR | 10-2016-0105295 | 9/2016 |
| KR | 10-2017-0050059 | 5/2017 |

OTHER PUBLICATIONS

Korean Office Action, with English translation, corresponding to Korean Application No. 10-2018-0159872, dated Apr. 27, 2020.
Manuel Servin et al., "Linear analysis of the 4-step Carr'e phase shifting algorithm: spectrum, signal-to-noise ratio, and harmonics response", Mar. 2012, Centro de Investigaciones en Optica A. C., Loma del Bosque 115, Leon Guanajuato, 37000 Mexico.
Gerd Häusler et al., "Microdeflectometry—a novel tool to acquire 3D microtopography with nanometer height resolution", Institute of Optics, Information and Photonics, Feb. 15, 2008.
Korean Office Action, with English translation, corresponding to Korean Application No. 10-2021-0011397, dated Apr. 16, 2021.
European Office Action corresponding to European Application No. 19 203 002.1, dated Dec. 21, 2021.
"17123901_Search History", Innovation, Mar. 6, 2022, pp. 1-5.

* cited by examiner

FIG. 7

| Tilt Angle of Object | Tilt Angle of Object (Left Side) | | | | | | | |
|---|---|---|---|---|---|---|---|---|
| | I1 | I2 | I3 | I4 | Phase(deg) | A | B | B/A |
| 0 | 240.64 | 183.33 | 198.69 | 256.00 | 60.00 | 219.67 | 41.95 | 0.19 |
| 1 | 239.50 | 145.67 | 132.51 | 226.34 | 37.02 | 186.01 | 67.00 | 0.36 |
| 2 | 231.29 | 130.60 | 73.24 | 171.92 | 14.65 | 151.76 | 81.68 | 0.54 |
| 3 | 200.12 | 131.57 | 36.58 | 105.13 | 9.19 | 118.35 | 82.83 | 0.70 |
| 4 | 143.85 | 122.22 | 24.52 | 46.15 | -32.52 | 84.18 | 70.75 | 0.84 |
| 5 | 75.83 | 88.55 | 23.55 | 10.83 | -56.07 | 49.69 | 46.84 | 0.94 |
| 5.5 | 44.10 | 61.47 | 20.46 | 3.09 | -67.96 | 32.28 | 31.49 | 0.98 |
| 6 | 17.33 | 29.22 | 12.19 | 0.30 | -79.92 | 14.76 | 14.69 | 0.99 |

| Tilt Angle of Object | Tilt Angle of Object (Right Side) | | | | | | | |
|---|---|---|---|---|---|---|---|---|
| | I1 | I2 | I3 | I4 | Phase(deg) | A | B | B/A |
| 0 | 240.64 | 183.33 | 198.69 | 256.00 | 60.00 | 219.67 | 41.95 | 0.19 |
| 1 | 194.19 | 119.51 | 177.82 | 252.50 | 82.99 | 186.01 | 67.00 | 0.36 |
| 2 | 129.77 | 74.00 | 174.74 | 230.52 | -73.97 | 152.26 | 81.42 | 0.53 |
| 3 | 66.01 | 54.15 | 170.68 | 182.55 | -50.82 | 118.35 | 82.83 | 0.70 |
| 4 | 21.42 | 51.53 | 150.78 | 116.84 | -26.79 | 85.14 | 72.46 | 0.85 |
| 5 | 2.96 | 46.48 | 96.41 | 52.90 | -3.93 | 49.69 | 46.84 | 0.94 |
| 5.5 | 1.09 | 36.64 | 63.47 | 27.93 | 7.95 | 32.28 | 31.49 | 0.98 |
| 6 | 0.95 | 19.77 | 28.57 | 9.76 | 19.92 | 14.76 | 14.69 | 0.99 |

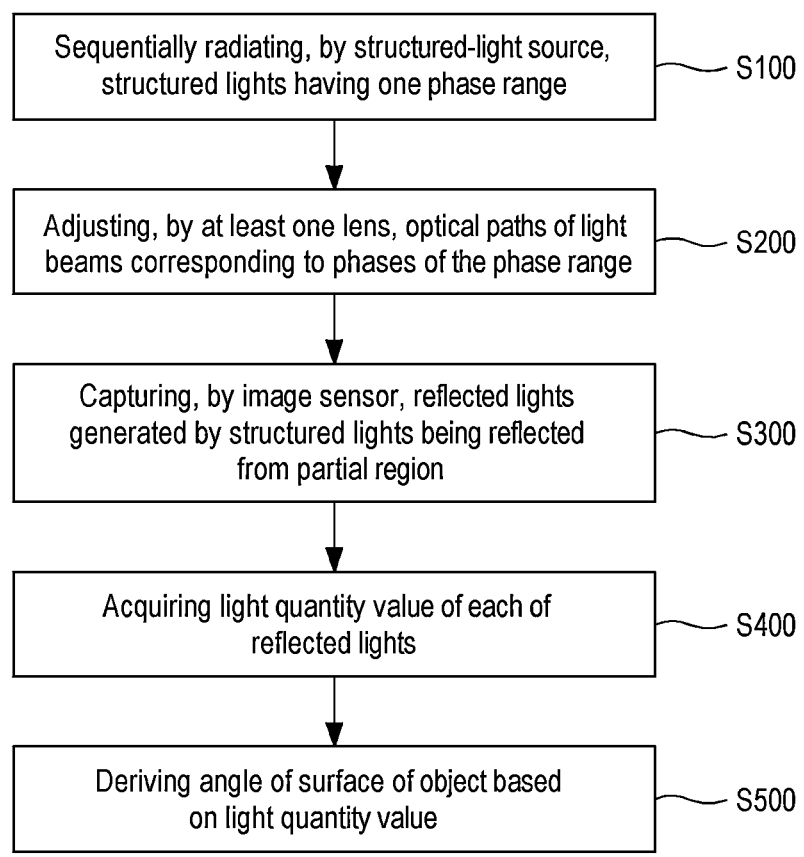

FOCUS-LESS INSPECTION APPARATUS AND METHOD

CROSS-REFERENCE TO RELATED APPLICATIONS

This application is a continuation application of U.S. patent application Ser. No. 17/123,901, filed Dec. 16, 2020 (now pending), the disclosure of which is herein incorporated by reference in its entirety. U.S. patent application Ser. No. 17/123,901 is a continuation application of U.S. patent application Ser. No. 16/653,291, filed Oct. 15, 2019 now U.S. Pat. No. 10,890,538, issued Jan. 12, 2021, the disclosure of which is incorporated herein by reference in its entirety. The U.S. patent application Ser. No. 16/653,291 claims the benefit of priority from Korean Patent Application No. 10-2018-0122354 filed on Oct. 15, 2018, and Korean Patent Application No. 10-2018-0159872 filed on Dec. 12, 2018, the entire contents of which are incorporated herein by reference.

TECHNICAL FIELD

The present disclosure relates to a focus-less inspection apparatus and method.

BACKGROUND

Various tests are conducted in a semiconductor manufacturing process in order to determine whether various treatments, processes and the like for semiconductors have been properly performed. For example, an inspection may be performed as to, for example, whether a component such as a die installed on a semiconductor substrate is disposed at a position where the component is supposed to be disposed on the semiconductor substrate.

In particular, in a die mounted on a semiconductor substrate, an inspection may be performed as to whether or not there is a tilt between the mounted die and the substrate. Generally, in the state in which solder or a solder ball is applied on a substrate, a die may be mounted on top of the solder or solder ball. In this operation, the lower surface of the die should be mounted parallel to the reference plane of the semiconductor substrate, but may be mounted such that the die is tilted at a predetermined angle or more with respect to the semiconductor substrate due to various factors (e.g., the application state of the solder or solder ball). Since the tilt may cause a defect in the semiconductor device, it is necessary to be able to determine in the process of inspecting the semiconductor whether the die is tilted and, if tilted, whether the die is tilted at a predetermined angle or more.

In addition, an inspection of a surface of any object may be performed irrespective of mounting on a substrate. In this inspection process, it is necessary to determine the angle of the unevenness of the surface of the object. The surface of the object may have large and small irregularities depending on the shape of the object. These irregularities may be caused by manufacturing defects, or may be intentionally formed by design. It is necessary to measure the angle of the surface of the object with respect to a reference plane.

In order to perform an inspection for tilt or the like, a three-dimensional inspection apparatus for irradiating the semiconductor die with three-dimensional illumination may be utilized. A method of measuring the degree of tilt of an object using an imaging position of a reflected light from the object has been used. This method measures the degree of tilt of an object using a difference between the imaging position of a reflected light reflected from a non-tilted object and the imaging position of a reflected light reflected from a tilted object. However, this method has a problem in that a large space is required for measuring a changed imaging position of the reflected light because the reflection angle greatly changes even if the object is tilted by only a small angle. This problem has made it difficult to miniaturize inspection equipment.

In addition, a method has been conventionally used in which a structured light is radiated to an object, a diffraction pattern is formed by the structured light in the air at a predetermined distance from the object, and the degree of tilt of the object is measured through a phase change of the diffraction pattern, which is caused as the object is tilted. In this method, as the object is tilted, the range of a measured diffraction pattern changes due to the change of the position of a camera aperture, and the tilt angle of the object may be derived using the phase change of the diffraction pattern caused thereby. However, in this method, there is a problem in that a lot of noise is generated because the diffraction pattern is physically formed in the air.

SUMMARY

The present disclosure has been made to solve the problems described above, and provides a technique for measuring a degree of tilt or an object mounted on a substrate or an angle of a surface of the object using a reflected light quantity from the object.

As an aspect of the present disclosure, an inspection apparatus is proposed. An inspection apparatus according to an aspect of the present disclosure may include: a structured-light source configured to sequentially radiate a plurality of structured lights having one phase range; at least one lens configured to adjust, for each of the plurality of structured lights, optical paths of light beams corresponding to phases of the phase range such that a light beam corresponding to one phase of the phase range arrives at each point of a partial region on a surface of an object; an image sensor configured to capture a plurality of reflected lights generated by each of the plurality of structured lights being reflected from the partial region; and a processor electrically connected to the structured-light source, the at least one lens and the image sensor, the processor being configured to: acquire a light quantity value of each of the plurality of reflected lights from the image sensor; and derive an angle of the surface of the object with respect to a reference plane by deriving phase values of the plurality of reflected lights based on the light quantity value for each of the plurality of reflected lights.

In an embodiment, the inspection apparatus may further include: a memory, which is electrically connected to the processor, configured to store reference information indicating a relation between the angle of the surface of the object and the phase values of the plurality of reflected lights.

In an embodiment, the processor may be configured to derive the angle of the surface of the object based on the phase values of the plurality of reflected lights and the reference information acquired from the memory.

In an embodiment, the phase range may not be an integer multiple of a period of the plurality of structured lights.

In an embodiment, the phase range may be greater than a phase range corresponding to a half-period of the plurality of structured lights and smaller than a phase range corresponding to the period of the plurality of structured lights.

In an embodiment, the inspection apparatus may further include: a first beam splitter disposed on a first axis perpendicular to the reference plane, and configured to adjust an optical path of each of the plurality of structured lights radiated from the structured-light source such that each of the plurality of structured lights is directed toward the surface of the object, wherein the image sensor is disposed on the first axis.

In an embodiment, the inspection apparatus may further include: a first diaphragm configured to pass each of the plurality of structured lights radiated from the structured-light source toward the first beam splitter; and a second diaphragm configured to pass each of the plurality of reflected lights reflected from the surface of the object toward the image sensor, wherein the light quantity value is determined based on a light quantity of each of the plurality of reflected lights passing through the second diaphragm and being captured by the image sensor, each of the plurality of reflected lights being generated by the plurality of structured lights passing through the first diaphragm and being reflected from the surface of the object, wherein the light quantity of each of the plurality of reflected lights passing through the second diaphragm changes depending on the angle of the surface of the object.

In an embodiment, a light beam having an average light quantity of the structured light and corresponding to the phase range may arrive at each point of the partial region on the surface of the object.

In an embodiment, each of the plurality of structured lights may be generated by phase-shifting one structured light by a predetermined phase interval.

In an embodiment, the structured-light source may include: a light source configured to radiate an illumination light; a diffusion plate configured to diffuse the illumination light; a second beam splitter configured to transmit a first polarized light of the diffused illumination light and to reflect a second polarized light of the diffused illumination light; and a pattern generator configured to reflect a part of the transmitted first polarized light as a first polarized light and to reflect an other part of the transmitted first polarized light as a second polarized light by converting the other part of the transmitted first polarized light into the second polarized light, wherein the second beam splitter transmits the reflected first polarized light from the pattern generator and reflects the converted second polarized light from the pattern generator toward the first beam splitter so as to generate the plurality of structured lights.

In an embodiment, the pattern generator may be a Liquid Crystal on Silicon (LCoS).

In an embodiment, each of the plurality of structured lights may have a pattern oriented in a first direction or a pattern oriented in a second direction perpendicular to the first direction.

As an aspect of the present disclosure, an inspection method performed by an inspection apparatus is proposed. An inspection method according to an aspect of the present disclosure may include: sequentially radiating, by a structured-light source of the inspection apparatus, each of a plurality of structured lights having one phase range; adjusting for each of the plurality of structured lights, by at least one lens of the inspection apparatus, optical paths of light beams corresponding to phases of the phase range such that a light beam corresponding to one phase of the phase range arrives at each point of a partial region on a surface of an object; capturing, by an image sensor of the inspection apparatus, a plurality of reflected lights generated by each of the plurality of structured lights being reflected from the partial region; acquiring, by a processor of the inspection apparatus, a light quantity value of each of the plurality of reflected lights from the image sensor; deriving, by the processor, a phase value of each of the plurality of reflected lights based on the light quantity value; acquiring, by the processor, reference information indicating a relation between an angle of the surface of the object with respect to a reference plane and the phase value of each of the plurality of reflected lights; and deriving, by the processor, the angle of the surface of the object based on the phase value of each of the plurality of reflected lights and the reference information.

In an embodiment, the phase range may not be an integer multiple of a period of the plurality of structured lights.

In an embodiment, the inspection apparatus may further comprise: a first diaphragm configured to pass each of the plurality of structured lights radiated from the structured-light source toward a first beam splitter; and a second diaphragm configured to pass each of the plurality of reflected lights reflected from the surface of the object toward the image sensor, wherein the light quantity value is determined based on a light quantity of each of the plurality of reflected lights passing through the second diaphragm and being captured by the image sensor, each of the plurality of reflected lights being generated by the plurality of structured lights passing through the first diaphragm and being reflected from the surface of the object, wherein the light quantity of each of the plurality of reflected lights passing through the second diaphragm changes depending on the angle of the surface of the object.

In an embodiment, a light beam having an average light quantity of the structured light and corresponding to the phase range may arrive at each point of the partial region on the surface of the object.

In an embodiment, each of the plurality of structured lights may be generated by phase-shifting one structured light by a predetermined phase interval.

As an aspect of the present disclosure, a non-transitory computer-readable storage medium that stores a program is proposed. In a storage medium according to an aspect of the present disclosure, the program may include executable commands that, when executed by a processor, cause the processor to perform: acquiring a light quantity value of each of a plurality of reflected lights generated by each of a plurality of structured lights being reflected from a partial region of a surface of an object, wherein the plurality of structured lights having a predetermined phase range are radiated such that a light beam corresponding to one phase of the phase range arrives at each point of the partial region on the surface of the object; deriving a phase value of each of the plurality of reflected lights based on the light quantity value; acquiring reference information indicating a relation between an angle of the surface of the object with respect to a reference plane and the phase value of each of the plurality of reflected lights; and deriving the angle of the surface of the object based on the phase value of each of the plurality of reflected lights and the reference information.

In an embodiment, a light beam having an average light quantity of the structured light and corresponding to the phase range may arrive at each point of the partial region on the surface of the object.

An inspection apparatus according to various embodiments of the present disclosure is able to efficiently measure the degree of tilt of an object with respect to a substrate or the angle of the surface of the object using the light quantity of a reflected light from the object.

An inspection apparatus according to various embodiments of the present disclosure does not observe the amount of change in the position at which the reflected light, reflected from an object, is imaged. Thus, it is not necessary to increase the size of the apparatus in order to measure the degree of tilt of the object or the angle of the surface of the object.

An inspection apparatus according to various embodiments of the present disclosure does not use a diffraction pattern formed in the air in front of an object. Thus, the inspection apparatus is able to be relatively robust against noise in measuring the degree of tilt of the object or the angle of the surface of the object.

BRIEF DESCRIPTION OF DRAWINGS

The above and other aspects, features and advantages of the present disclosure will be more apparent from the following detailed description taken in conjunction with the accompanying drawings, in which:

FIG. 7 is a table illustrating reference information according to an embodiment of the present disclosure.

FIG. 10 is a flowchart illustrating an embodiment of an inspection method that may be performed using an inspection apparatus 10 according to the present disclosure.

DETAILED DESCRIPTION

Figure 1:
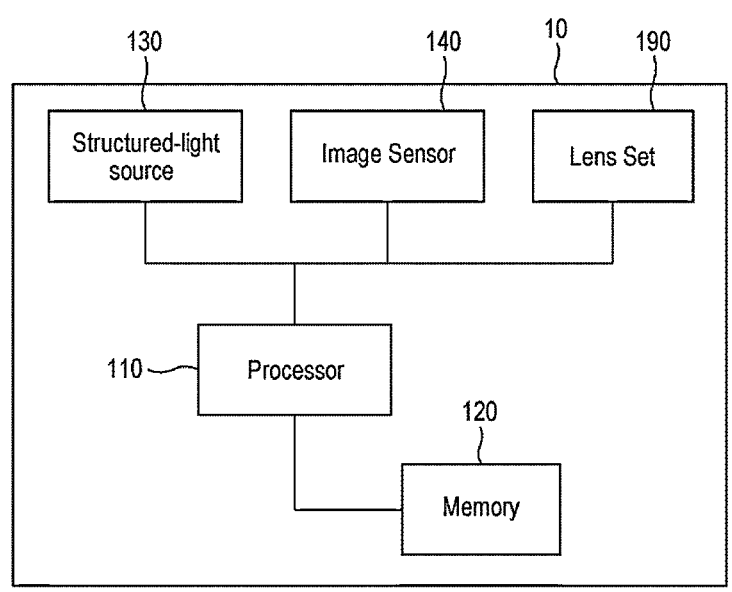
FIG. 1 is a block diagram of an inspection apparatus according to various embodiments of the present disclosure.

Various embodiments described herein are illustrated for the purpose of clarifying the technical idea of the present disclosure, and are not intended to limit the present disclosure to any specific embodiment. The technical idea of the present disclosure includes various modifications, equivalents, alternatives and embodiments selectively combined from all or part of each embodiment described in the present document. Further, the scope of the technical idea of the present disclosure is not limited to the various embodiments described below, and the detailed description thereof.

In the present disclosure, terms including technical or scientific terms, may have a meaning that is generally understood by those ordinarily skilled in the art to which this disclosure belongs, unless otherwise defined.

In the present disclosure, the expressions "A includes B", "A may include B", "A is provided with B", "A may be provided with B", "A has B", "A may have B", and the like, mean that corresponding features (e.g., functions, operations, or components, etc.) are present, but do not exclude the presence of other additional features. That is, such expressions should be understood as open-ended terms that include the possibility of including other embodiments.

In the present disclosure, the singular of an expression may include the meaning of the plural of the expression, unless the context dictates otherwise, and the same applies to singular forms of expressions as set forth in the claims.

In the present disclosure, the expressions "1st", "2nd", "first", "second", and the like are used to distinguish one object from another in referring to plural identical objects unless otherwise indicated in the context, and do not limit the order or importance of objects.

In the present disclosure, the expressions "A, B and C," "A, B or C," "A, B and/or C," "at least one of A, B, and C," "at least one of A, B, and C," "at least one of A, B, and/or C," and the like may mean each listed item or any possible combination of the listed items. For example, the expression "at least one of A or B" may mean all of (1) at least one A, (2) at least one B, and (3) at least one A and at least one B.

In the present disclosure, the expression "based on . . . " is used to describe one or more factors that affect the action or operation of a decision or determination, described in a phrase or sentence in which the expression is contained, and does not exclude additional factors that influence the action or operation of the corresponding decisions or determination.

In the present disclosure, the expression that a component (e.g., a first component) is "connected" or "coupled" to another component (e.g., a second component) may mean that the first component is connected or coupled to the second component not only directly, but also via another new component (e.g., a third component).

In the present disclosure, the expression "configured to . . . " is intended to encompass, depending on the context, the meanings of "set to . . . ," "being capable of . . . ," "altered to . . . ," "made to . . . ," and "able to . . . ," and the like. The corresponding expression is not limited to the meaning "specifically designed in hardware". For example, a processor configured to perform a specific operation may mean a generic-purpose processor that can perform the specific operation by executing software.

In order to illustrate various embodiments of the present disclosure, an orthogonal coordinate system having X, Y, and Z axes orthogonal to each other may be defined. The expressions such as "X-axis direction," "Y-axis direction", "Z-axis direction", and the like of the orthogonal coordinate system used in the present disclosure may mean both directions in which each axis of the orthogonal coordinate system extends unless specifically defined otherwise. The plus (+) sign prefixed to a term indicating each axis direction may mean the positive direction, which is one of both directions extending in the corresponding axis direction, and the minus (−) sign prefixed to a term indicating each axis direction may mean the negative direction, which is the other one of the both directions extending in the corresponding axis direction.

In the present disclosure, a substrate is a plate or a container where an element such as a semiconductor chip is mounted, and may serve as an inter-device connection path for electrical signals. The substrate may be used for producing an integrated circuit or the like, and may be made of a material such as silicon. For example, the substrate may be a Printed Circuit Board (PCB), and may be referred to as a wafer or the like in some embodiments.

Various embodiments of the present disclosure will now be described with reference to the accompanying drawings. In the accompanying drawings and the descriptions of the drawings, substantially equivalent elements may be given the same reference numerals. In the following description of the various embodiments, a description of the same or corresponding components may be omitted. However, this does not mean that the components are not included in the embodiment.

FIG. 1 is a block diagram of an inspection apparatus 10 according to various embodiments of the present disclosure. The inspection apparatus 10 according to various embodiments of the present disclosure is able to measure the degree of tilt of an object (e.g., a component) mounted on a substrate with respect to the substrate surface or the angle of the surface of the object with respect to a reference plane. For convenience of explanation in the present disclosure, it is assumed that the inspection apparatus measures the angle of the surface of the object. However, the inspection apparatus may also be used for measuring the degree of tilt of a component mounted on a substrate. Here, the reference plane may be a virtual plane serving as a reference in measuring the angle of unevenness of the surface of an object or the like. The angle of the surface of the object may mean the angle of a tangent at a point on the surface of the object with respect to the reference plane. In an embodiment, the inspection apparatus 10 may derive the angle of the surface of the object based on the light quantity of reflected light reflected from the surface of the object.

The inspection apparatus 10 according to various embodiments of the present disclosure may include a structured-light source 130, a lens set 190, an image sensor 140, a processor 110, and/or a memory 120. In an embodiment, at least one of these components of the inspection apparatus 10 may be omitted, or another component may be added to the inspection apparatus 10. Additionally or alternatively, some of the components may be integrated or implemented as a single entity or multiple entities.

At least some of the components inside or outside the inspection apparatus 10 are connected to each other via a bus, a General-Purpose Input/Output (GPIO), a Serial Peripheral Interface (SPI), or a Mobile Industry Processor Interface (MIPI) so as to exchange data and/or signals.

The structured-light source 130 may sequentially radiate a plurality of structured lights having one phase range. Structured light may be light added with a characteristic (pattern) unique to the light for object recognition or the like. In an embodiment, the structured light may have a pattern in which brightness progressively changes. In an embodiment, the pattern of the structured light may have a constant period. In an embodiment, the pattern of the structured light may be in the form of a sine wave. The pattern of the structured light may be formed by, for example, the brightness of light. In an embodiment, the structured-light source 130 may include a plurality of point light sources. The plurality of point light sources may have different brightnesses depending on the positions of the plurality of point light sources such that the corresponding structured light has a pattern. In an embodiment, the structured light may have a pattern corresponding to a predetermined phase range. In an embodiment, a plurality of structured lights may be generated by phase-shifting one structured light by a predetermined phase interval.

The lens set 190 may adjust the optical paths of the plurality of structured lights. The lens set 190 may include at least one lens. The lens set 190 may adjust an optical path of the light beam corresponding to each phase such that the light beam corresponding to one phase of the structured light arrives at each point of a partial region on the surface of the object 3. Here, the partial region may be referred to as a Field Of View (FOV). The light beam corresponding to one phase of the pattern of the structured light may be uniformly radiated to the whole region of the FOV. In this way, the lens set 190 may adjust the optical path of each of the plurality of structured lights. According to an embodiment, the inspection apparatus 10 may further include a first beam splitter 150 to be described later, and the first beam splitter 150 may adjust the optical path of each of the plurality of structured lights together with the lens set 190 as described above.

The image sensor 140 may capture a plurality of reflected lights generated when each of the plurality of structured lights is reflected from the partial region on the surface of the object 3 described above. The image of the above-mentioned partial region (the FOV) may be picked up by the image sensor. One point of the FOV may be imaged at one point (pixel) of the image sensor. According to an embodiment, the image sensor 140 may be implemented by a Charge Coupled Device (CCD) or a Complementary Metal-Oxide-Semiconductor (CMOS).

The processor 110 may drive software (e.g., a program) so as to control at least one component of the inspection apparatus 10 connected to the processor 110. The processor 110 may also perform various operations, processes, data generation, processing, and the like, which are related to the present disclosure. The processor 110 may also load data or the like from memory 120 or store the data in the memory 120.

The processor 110 may acquire a light quantity value of each of the plurality of reflected lights from the image sensor 140. The processor 110 may obtain the light quantity value of a reflected light reflected from the surface of the object 3 by any one structured light among the plurality of structured lights that have been generated by the phase-shift described above. In the same manner, the processor 110 may acquire the light quantity value of each of the plurality of reflected lights generated by the plurality of structured lights. The light quantity values of the reflected lights obtained by the processor 110 from the image sensor 140 may be affected by the light quantity passing through the first diaphragm 160 and the second diaphragm 170, which will be described later. The processor 110 may derive the angle of the surface of the object 3 based on the light quantity value for each of the plurality of reflected lights.

In an embodiment, the inspection apparatus 10 may further include a memory 120. The memory 120 may store various data. The data stored in the memory 120 may be acquired, processed, or used by at least one component of the inspection apparatus 10, and may include software (e.g., a program). The memory 120 may include a volatile memory and/or a non-volatile memory. The memory 120 may store reference information. The reference information may indicate a relation between the angle of the surface of the object 3 and the phase values of the plurality of reflected lights.

In an embodiment, the processor 110 may derive the phase value of each of the plurality of reflected lights based on the light quantity value of each of the plurality of reflected lights acquired from the image sensor 140. The processor 110 may derive the angle of the surface of the object 3 based on the derived phase value of each of the reflected lights and the reference information acquired from the memory 120.

In the present disclosure, a program is software stored in the memory 120 and may include an operating system for controlling the resources of the inspection apparatus 10, an application, and/or a middleware that provides various functions to the application, so that the application can utilize the resources of the inspection apparatus.

Figure 2:
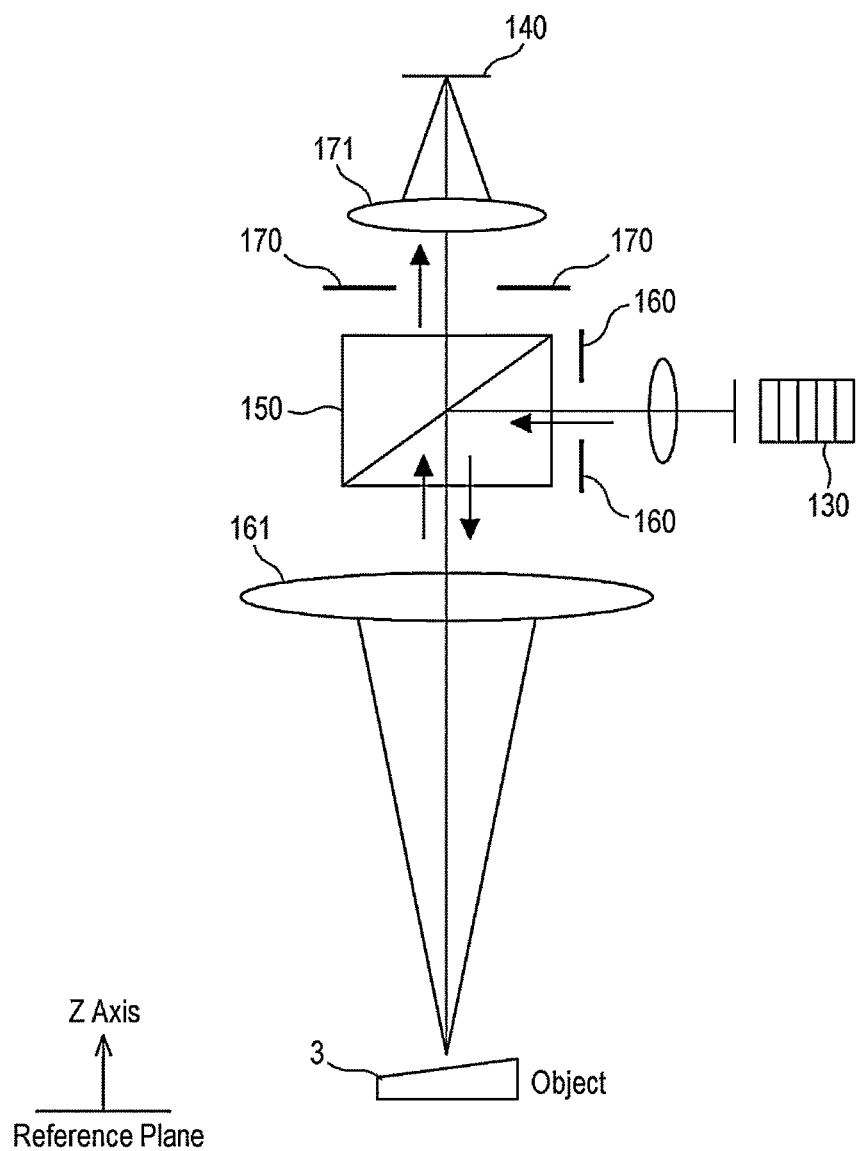
FIG. 2 illustrates an embodiment of a process of operating the inspection apparatus according to the present disclosure.

FIG. 2 illustrates an embodiment of a process of operating the inspection apparatus 10 according to the present disclosure. As described above, the inspection apparatus 10 according to various embodiments of the present disclosure may measure the angle of the surface of an object with respect to a reference plane.

Specifically, the structured-light source 130 of the inspection apparatus 10 may radiate a structured light having a phase range. In an embodiment, the structured-light source 130 may sequentially radiate a plurality of structured lights that are generated by phase-shifting one structured light by a predetermined phase interval.

The structured light may be radiated to an object 3 via the lens set 190 and/or the first beam splitter 150. The lens set 190 may include at least one lens 161 and/or 171. The structured light may be transmitted to the first beam splitter 150 via the lens in front of the structured-light source 130 and the structured light reflected by the first beam splitter 150 may be radiated to the object 3 through the lens 161. In some embodiments, the lens in front of the light source may be omitted. The structured light radiated from the structured-light source 130 may pass through the first diaphragm 160 upon being incident on the first beam splitter 150. The first beam splitter 150 may adjust the optical path such that each of the plurality of structured lights radiated from the structured-light source 130 is directed to the object 3.

In an embodiment, the structured light may be radiated on the object 3 such that a light beam corresponding to one phase of the structured light arrives at each point of a partial region on the object 3. The structured light may have a pattern according to a predetermined period, and each light beam forming the pattern of the structured light may have a phase. At least one lens of the inspection apparatus 10 may be configured to adjust the optical path of the structured light such that each light beam corresponding to one phase of the structured light is uniformly radiated to the above-described partial region on the object 3, rather than being concentrated at any one point on the object 3. That is, the light beam corresponding to one phase within the above-described phase range may be divided into each point of the partial region on the object 3 and incident thereon. Similarly, the at least one lens may adjust the optical path of the structured light such that the light beams corresponding to respective phases within the above-described phase range of the structured light are uniformly radiated to the partial region on the object 3 described above. Since the light beams of respective phases of the structured light are radiated to the object in this form, a light beam having a light quantity corresponding to the average light quantity of the structured light may be radiated all over the above-described partial region on the object.

Each of the plurality of structured lights may be reflected from the partial region on the object 3 to generate each of a plurality of reflected lights. Each of the plurality of reflected lights may pass through the lens 161 and the first beam splitter 150. Each of the plurality of reflected lights having passed through the first beam splitter 150 may be input to the image sensor 140 via the second diaphragm 170 and the lens 171. The image sensor 140 of the inspection apparatus 10 may capture each of the plurality of reflected lights.

The processor 110 of the inspection apparatus 10 may acquire a light quantity value of each of the plurality of reflected lights from the image sensor 140. The inspection apparatus 10 may derive the angle of the surface of the object 3 based on the acquired light quantity value. In this operation, each of the reflected lights reflected from the surface of the object 3 may have an average light quantity of structured light according to the above-mentioned phase range. When the surface of the object 3 is tilted with respect to the reference plane, only a portion of the reflected light reflected from the surface of the object 3 passes through the second diaphragm 170 to be input into the image sensor 140. Therefore, the image sensor 140 may be able to capture only a portion of the reflected light. The portion of the reflected light captured may correspond to a partial phase range of the above-mentioned phase range of the corresponding structured light. As a result, the light quantity input into the image sensor 140 through the second diaphragm 170 may vary depending on the angle of the surface of the object 3. The inspection apparatus 10 may derive the angle of the surface of the object 3 using a change in the light quantity.

In an embodiment, the inspection apparatus 10 may measure the light quantity for each of the plurality of reflected lights so as to derive the angle of the surface of the object 3. In an embodiment, the inspection apparatus 10 may derive the angle of the surface of the object 3 based on the obtained light quantity value and the reference information indicating the relation between light quantity values and angles of a surface of an object. In an embodiment, the lenses 161 and 171, the first beam splitter 150, the second diaphragm 170 and/or the image sensor 140 may be disposed on a first axis perpendicular to the reference plane.

In an embodiment, the inspection apparatus 10 may further include a communication interface (not illustrated). The communication interface may perform wireless or wired communication between the inspection apparatus 10 and the server, or between the inspection apparatus 10 and another external apparatus. For example, the communication interface may perform wireless communication in accordance with Long-Term Evolution (LTE), LTE-A (LTE Advance), Code Division Multiple Access (CDMA), Wideband CDMA (WCDMA), Wireless Broadband (WiBro), Wi-Fi, Bluetooth, Near Field Communication (NFC), Global Positioning System (GPS), Global Navigation Satellite System (GNSS), or the like. For example, the communication interface may perform wired communication in accordance with Universal Serial Bus (USB), High Definition Multimedia Interface (HDMI), Recommended Standard 232 (RS-232), Plain Old Telephone Service (POTS), or the like. In an embodiment, the processor 110 may control the communication interface so as to acquire necessary information from the server. The information acquired from the server may be stored in the memory 120. In an embodiment, the information acquired from the server may include the above-described reference information or the like.

In an embodiment, the inspection apparatus 10 may further include an input device (not illustrated). The input device may be a device that receives data input from the outside so as to transfer the data to at least one component of the inspection apparatus 10. The input device may include, for example, a mouse, a keyboard, and a touch pad.

In an embodiment, the inspection apparatus 10 may further include an output device (not illustrated). The output devices may visually provide various data such as an inspection result and an operation state of the inspection apparatus 10 to the user. The output devices may include, for example, a display, a projector, a hologram, and the like.

In an embodiment, the inspection apparatus 10 may include various types of devices. The inspection apparatus 10 may include, for example, a portable communication device, a computer device, or a device according to one or more combinations of the above-described devices. The inspection apparatus 10 of the present disclosure is not limited to the above-described devices.

Various embodiments of the inspection apparatus 10 according to the present disclosure may be combined with one another. Respective embodiments may be combined according to the number of cases, and an embodiment of a combined inspection apparatus 10 also belongs to the scope of the present disclosure. In addition, the internal/external components of the inspection apparatus 10 according to the above-described present disclosure may be added, changed, substituted, or deleted in accordance with embodiments. In addition, the internal/external components of the above-described inspection apparatus 10 may be implemented using hardware components.

Figure 3:
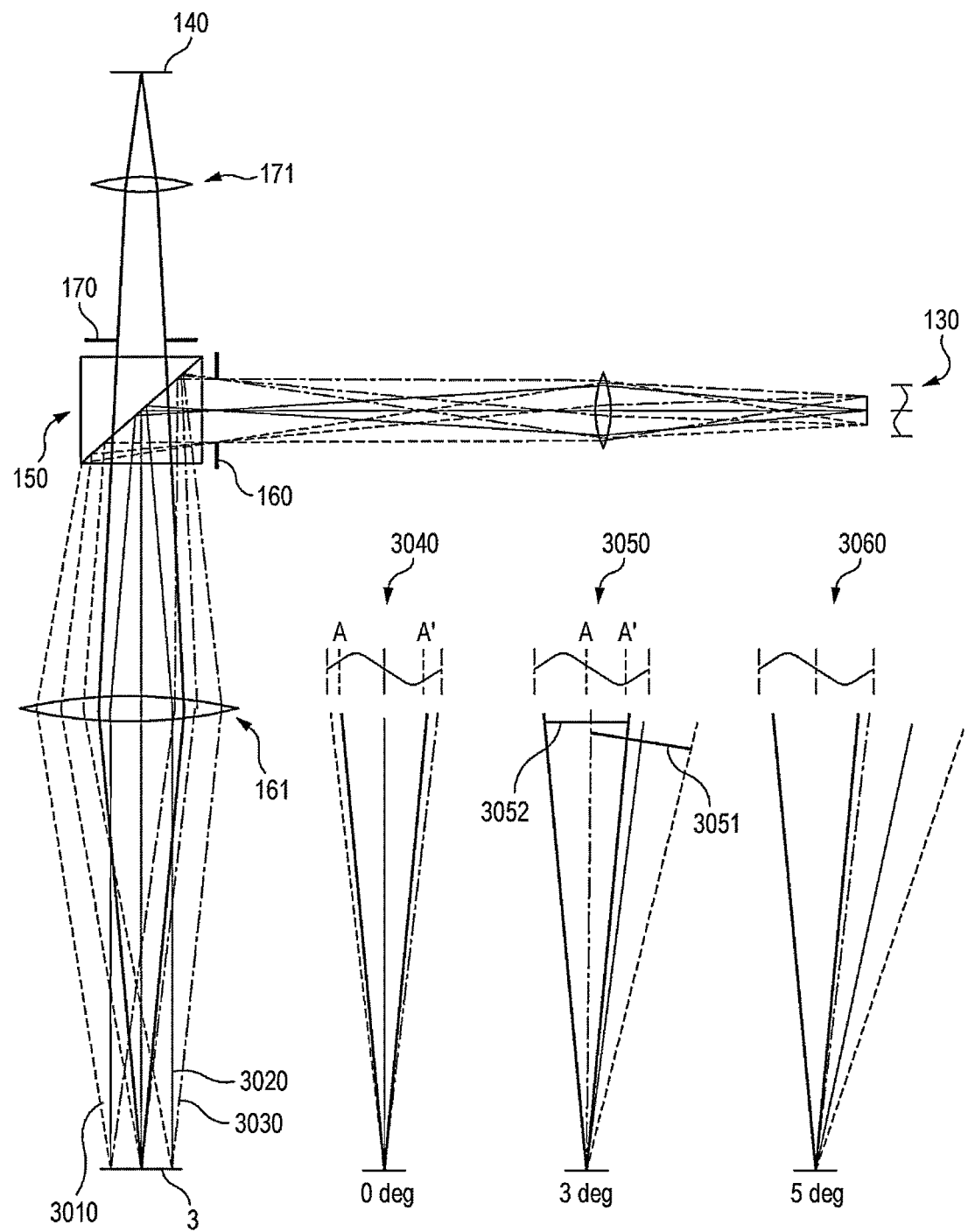
FIG. 3 illustrates a process in which structured light is radiated onto the object according to an embodiment of the present disclosure.

FIG. 3 illustrates a process in which the structured lights are radiated onto the object according to an embodiment of the present disclosure. As described above, for each of the plurality of structured lights, the optical path may be adjusted such that each light beam corresponding to one phase of the one structured light is radiated over the entirety of the above-mentioned partial region of the object 3. The following description will be made based on one structured light.

The structured-light source 130 may radiate a structured light having one phase range. Optical paths 3010, 3020, and 3030 of light beams corresponding to three arbitrary phases within the phase range are illustrated. Each light beam may be radiated to the surface of the object 3 via the first diaphragm 160, the first beam splitter 150, and/or at least one lens. As described above, a light beam corresponding to one phase may be radiated to the entirety of the above-mentioned partial region of the object 3. That is, the light beam 3010 corresponding to one phase may be radiated so as to arrive at each point of the partial region on the object 3. Light beams 3020 and 3030 corresponding to different phases of the structured light may also be radiated to the object 3 in the same manner. Accordingly, at one point of the partial region on the object 3, portions of all the light beams corresponding to each phase of the phase range may be radiated. For example, in the illustrated embodiment, portions of all the light beams 3010, 3020, and 3030 arrive at one point of the partial region on the object 3, while other portions of all the light beams 3010, 3020, and 3030 arrive at a different point of the partial region. Therefore, a light beam having an average light quantity of the structured light corresponding to the above-described phase range may be radiated over the entirety of the partial region of the object 3.

A light radiated onto the partial region on the surface of the object 3 is reflected to generate a reflected light, and the reflected light may be input into the image sensor 140. The reflected light may be input into the image sensor 140 through the second diaphragm 170. As described above, only some of the reflected light may pass through the second diaphragm 170 when the surface of the object 3 is tilted with respect to the reference plane (i.e., when the angle of the surface of the object is not zero). That is, only some of the light passing through the first diaphragm 160 may pass through the second diaphragm 170. Some of the reflected light passing through the second diaphragm 170 may correspond to a partial phase range of the phase range of the structured light radiated from the structured-light source 130. The average light quantity of the light corresponding to this partial phase range may be consequently captured by the image sensor 140.

In an illustrated embodiment (3040), the angle of the surface of the object 3 may be zero degrees. In this case, most of the light that corresponds to each phase of the structured light concentrated into one point of the partial region on the surface of the object 3, may be reflected from the surface of the object 3 and then input into the image sensor 140 through the second diaphragm 170. The light corresponding to the phase interval denoted by A and A' in the embodiment (3040) may be reflected from the surface of the object 3 and then input into the image sensor 140 through the second diaphragm 170.

In an illustrated embodiment (3050), the object 3 may be tilted at an angle of 3 degrees with respect to the reference plane. In this case, only some of the light that corresponds to each phase of the structured light concentrated into one point of the partial region on the surface of the object 3, may be reflected from the surface of the object 3 and then input into the image sensor 140 through the second diaphragm 170. Specifically, the region through which the first diaphragm 160 allows the structured light to pass may correspond to a section indicated by an illustrated straight line 3051. The region, which allows a light starting from one point on the surface of the object 3 to pass through the second diaphragm 170, may correspond to a section indicated by an illustrated straight line 3052. Accordingly, a light beam with the optical path passing through both the first diaphragm 160 and the second diaphragm 170 may be a light beam having a phase that belongs to the phase interval indicated by A and A' in the drawings. The light quantity of reflected light acquired by the image sensor 140 may be an average light quantity of the light beams corresponding to the phase interval indicated by A and A'.

In an illustrated embodiment (3060), the object 3 may be tilted at an angle of 5 degrees with respect to the reference plane. In this case, most of the light that corresponds to each phase of the structured light concentrated into one point of the partial region on the surface of the object 3, may be reflected from the surface of the object 3 and then may not be able to pass through the second diaphragm 170. Accordingly, the image sensor 140 may not be able to capture the reflected light. The angle of the surface of the object 3 in each of the above-described embodiments (3040, 3050, and 3060) may be an exemplary value selected for description.

That is, the light quantity input into the image sensor 140 through both the first diaphragm 160 and the second diaphragm 170 may vary depending on the angle of the surface of the object 3. The inspection apparatus 10 may derive the angle of the surface of the object 3 using a change in the light quantity of reflected light. Since the structured-light source sequentially radiates the plurality of structured lights, the operation described above can be applied in the same manner to each of the plurality of structured lights.

Figure 4:
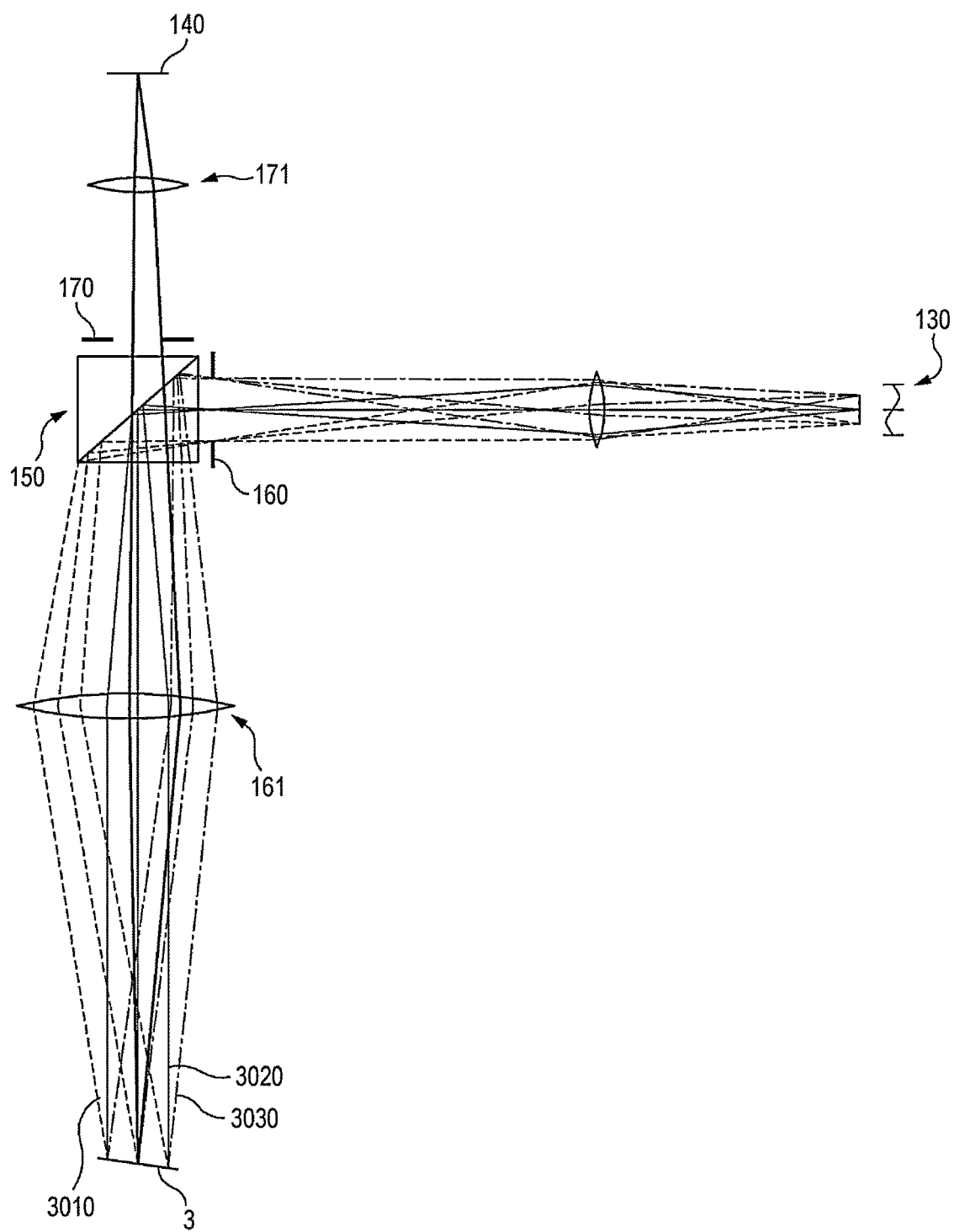
FIG. 4 illustrates a process in which reflected light passes through a second diaphragm according to an embodiment of the present disclosure.

FIG. 4 illustrates a process in which the reflected light passes through the second diaphragm according to an embodiment of the present disclosure. The illustrated embodiment may illustrate the case where the surface of the object is tilted at a predetermined angle with respect to the reference plane, as in the embodiment (3050) described above.

A structured light having one phase range may be radiated from the structured-light source 130 and may be uniformly radiated onto the partial region on the surface of the object 3. This may be performed as described above regardless of the angle of the surface of the object.

Since the surface of the object is tilted, only some of the reflected light may be input into the image sensor 140 through the second diaphragm 170. Of the reflected light generated by the light beams 3010, 3020, and 3030 incident on the partial region, only the portion of the reflected light traveling along the optical path within the range indicated by the thick solid lines may be input into the image sensor 140 through the second diaphragm 170.

The portion of the reflected light which is input into the image sensor 140 may be that which is obtained when light beams corresponding to a partial range of the phase range of the structured light are reflected from the surface of the object. Consequently, the light quantity of the reflected light acquired by the image sensor 140 may be the average light quantity of the light beams corresponding to the above-described partial range of the structured light.

Figure 5:
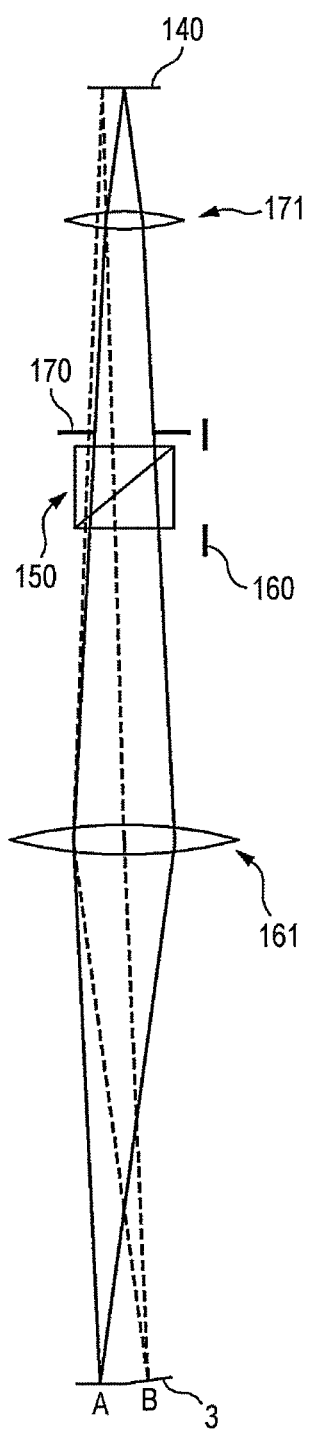
FIG. 5 illustrates a process in which reflected light passes through the second diaphragm according to an embodiment of the present disclosure.

FIG. 5 illustrates a process in which the reflected light passes through the second diaphragm according to an embodiment of the present disclosure. In the illustrated embodiment, a part of the surface of the object 3 may not be tilted with respect to the reference plane, and the other part may be tilted.

A light reflected from a point A of the surface of the object 3, which is not tilted with respect to the reference plane, may be input into a corresponding point of the image sensor 140 through the second diaphragm 170 as in the above-described embodiment 3040 (thick solid lines). The corresponding point of the image sensor 140 may receive the average light quantity of the structured light corresponding to the above-described phase range radiated from the structured-light source 130.

On the other hand, only a portion of light reflected from a point B of the surface of the object 3, which is tilted with respect to the reference plane, may be input into a corresponding point of the image sensor 140 through the second diaphragm 170 as in the above-described embodiment 3050 (thick dotted lines). The corresponding point of the image sensor 140 may receive the average light quantity of only the light beams of the structured light corresponding to the above-described partial range of the phase range radiated from the structured-light source 130.

A tilt value at each point of the partial region on the surface of the object may be obtained using each of average light quantity values which have been input for each point (pixel) of the image sensor 140.

Figure 6:
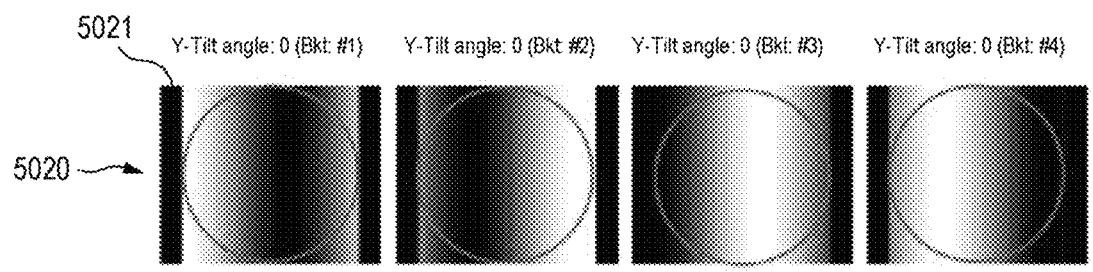
FIG. 6 illustrates the view of a plurality of structured lights in a first diaphragm 160 radiated from the structured-light source 130 according to an embodiment of the present disclosure.

FIG. 6 illustrates the view of a plurality of structured lights in a first diaphragm 160 radiated from the structured-light source 130 according to an embodiment of the present disclosure. As described above, the structured-light source 130 may radiate a plurality of structured lights having one phase range, and each of the plurality of structured lights may be generated by being phase-shifted by a predetermined phase interval. For example, when the structured-light source 130 is implemented by a square LCoS, the LCoS may have 1280×1024 pixels and of these, 1024×1024 pixels may generate a structured light. Depending on the phase range of each bucket, the light beams of the structured light radiated by the point light sources of the LCoS may have different brightness distributions.

A pattern of one structured light may have a period. The plurality of point light sources of the structured-light source 130 may vary the brightnesses of light beams radiated from the plurality of point light sources depending on the positions of the plurality of point light sources, thereby making the structured lights have patterns depending on the brightnesses. Assuming that the phase corresponding to one period is $2\pi$, the pattern of the structured light may become gradually brighter during the interval from 0 to $\pi/2$, and the pattern of the structured light may become gradually darker during the interval from $\pi/2$ to $3*\pi/2$, and the pattern of the structured light may become gradually brighter again during the interval from $3*\pi/2$ to $2\pi$.

The phase range of the structured light to be irradiated may be set according to a designer's intention. In an embodiment, the phase range may be set so as not to be one period or a multiple of one period of the pattern. That is, the phase range may be set to a phase range other than an integer multiple of the period of the structured light. At this time, the phase range may be set to a range other than the phase ranges corresponding to 0, $2\pi$, $4\pi$, . . . , and $2n\pi$. This is because, when a structured light having a phase range that is one period or a multiple of one period is used, the light beams corresponding to each phase of the structured light may cancel each other since a light corresponding to the average light quantity of the structured light is radiated to the partial region on the object 3. Therefore, in order to prevent the average light quantity from being canceled to zero, the phase range may be set so as not to be one period or a multiple of one period of the pattern. In one embodiment, periods of the plurality of structured lights may be the same.

In an embodiment, the phase range may be set to be greater than the phase range corresponding to a half-period of the structured light and smaller than the phase range corresponding to one period of the structured light. In an embodiment, the phase range may be set to be greater than the phase range corresponding to (N+1/2) period of the structured light (N is a natural number) and smaller than the phase range corresponding to (N+1) period of the structured light. That is, a range obtained by adding a range that corresponds to a multiple of one period to a range that is larger than a half-period and smaller than one period may be set as the above-described phase range. The phase range may be set in this manner when it is necessary to increase the total light quantity of the structured lights in order to facilitate the measurement of the reflected lights.

One structured light corresponding to the above-mentioned phase range may be phase-shifted by a predetermined phase interval to form the plurality of structured lights. In an embodiment, the above-described phase interval may be set to a value greater than zero and smaller than $\pi$. In an embodiment, the above-described phase interval may be set to $\pi/2$. For example, the structured light corresponding to one phase range may be phase-shifted by $\pi/2$ to form a plurality of structured lights.

The plurality of structured lights may be referred to as four buckets, including a zeroth bucket, a first bucket, a second bucket and a third bucket, respectively. Each of the plurality of structured lights may also have a phase range corresponding to a predetermined phase range (e.g., $\alpha$). Since the structured lights may be generated by the phase-shifting of one structured light, each of the structured lights may have a phase range from 0 to $\alpha$, a phase range from $\pi/2$ to $\pi/2+\alpha$, a phase range from $\pi$ to $\pi+\alpha$, and a phase range from $3*\pi/2$ to $3*\pi/2+\alpha$ of one structured light, respectively. Each of the plurality of structured lights generated in the above-described manner may be sequentially radiated to the object 3.

In the first diaphragm 160, the radiated structured light of each bucket at the structured-light source 130 may be displayed as shown in the drawing (5020). The region of the first diaphragm 160 through which a structured light passes may be circular. Thus, of the structured lights in the rectangular shape in the structured-light source 130, the light beams corresponding to the circular regions may be radiated to the object 3.

According to the embodiment, the inspection apparatus according to the present disclosure may measure the angle of the surface of the object using only one structured light. It may be possible to derive the angle of the surface of the object by radiating one structured light to the object and comparing the light quantity of the corresponding reflected light with the reference information. However, by measuring the angle of the surface of the object using a plurality of structured lights, it is possible to reduce various measurement errors such as an error caused due to the material of the surface of the object.

The total light quantity value of each of the structured lights in the structured-light source 130 may be calculated using the following equation.

$$I_{LCoS} = \int_\alpha^\beta (I_0 + I^\circ * \sin(\varphi)) d\varphi \quad \text{[Equation 1]}$$

$I^\circ$ may be a constant that determines the amplitude of a sinusoidal graph of a pattern of a structured light, and $I_o$ may be a constant that determines the offset of the sinusoidal graph of the pattern. The total light quantity value $I_{LCoS}$ may be derived by integrating the structured light at the structured-light source 130 in the phase range (from $\alpha$ to $\beta$).

FIG. 7 is a table illustrating the reference information according to an embodiment of the present disclosure. As described above, the reference information may indicate a relation between the angle of the surface of the object 3 and the phase values of the plurality of reflected lights. The numerical values represented by the shown reference information are exemplary values, and the values of the reference information may vary depending on embodiments.

When one structured light is reflected from the above-mentioned partial region of the object 3 and is captured by the image sensor 140, the light quantity value $I_n$ of the reflected light may be expressed as in the following equation.

$$I_n = A + B \cos(\varphi(x,y) - \alpha(t)) \quad \text{[Equation 2]}$$

A and B may correspond to $I_o$ and $I^\circ$ described above, respectively. $\Phi(x, y)$ may be a phase value of a reflected light beam reflected from a point (x, y) of the partial region on the object 3. $\alpha(t)$ may represent the above-described phase shift amount.

The light quantity values $I_1$, $I_2$, $I_3$, and $I_4$ of the reflected lights generated by reflecting each of the plurality of structured lights, which are generated by phase shifting by a phase interval of $\pi/2$, from the surface of the object 3 may be expressed by the following equation. That is, the light quantity of the reflected lights generated due to the structured lights, which correspond to the four buckets, respectively, may be expressed as follows. Equation 3 may be obtained by applying the corresponding values of $\alpha(t)$ to Equation 2, respectively, and then summarizing Equation 2.

$$\begin{aligned} I_1 &= A + B\cos(\varphi) & a(t) &= 0 \\ I_2 &= A - B\sin(\varphi) & a(t) &= \frac{\pi}{2} \\ I_3 &= A - B\cos(\varphi) & a(t) &= \pi \\ I_4 &= A + B\sin(\varphi) & a(t) &= \frac{3\pi}{2} \end{aligned} \quad \text{[Equation 3]}$$

As described above, the light quantity acquired by the image sensor 140 may be the average light quantity of light beams corresponding to a part of the phase range of the radiated structured light. Depending on the angle of the surface of the object, a part of the phase range may change, and the light quantity acquired by the image sensor 140 may also change. In this operation, even if the object is tilted at the same angle, since the plurality of structured lights are phase-shifted, light beams corresponding to the above-mentioned part of the phase range may be changed in configuration. That is, depending on which bucket is used, light beams corresponding to the above-mentioned part of the phase range may be varied, and thus the average light quantity value acquired by the image sensor 140 may also be varied. The light quantities of the reflected lights of the buckets may be the above-described $I_1$, $I_2$, $I_3$, and $I_4$, respectively.

The light quantity values $I_1$, $I_2$, $I_3$, and $I_4$ of the respective reflected lights are values that can be measured by the image sensor 140. A, B, and $\varphi$ can be derived using the above-described four equations for $I_1$, $I_2$, $I_3$, and $I_4$. Since there are three unknowns, at least three equations are required. Thus, measurements through three or more different structured lights may have to be performed at least three times. By summarizing Equation 3, the phase value $\varphi$ of a reflected light may be derived as follows.

$$\varphi = \tan^{-1}\left(\frac{I_4 - I_2}{I_1 - I_3}\right) \quad \text{[Equation 4]}$$

As illustrated in the drawing, the reference information may include the tilt angles of the object, the light quantity values $I_1$, $I_2$, $I_3$, and $I_4$ of the reflected light for each bucket measured for each corresponding angle, and information on the phase values of the reflected lights derived through the measured light quantity values. For example, when the tilt angle of the object is 1 degree, the light quantity values $I_1$, $I_2$, $I_3$, and $I_4$ of the reflected lights for respective measured buckets may be 239.50, 145.67, 132.41, and 226.34, respectively. The phase value derived from these light quantity values may be 37.02 degrees. In an embodiment, the reference information may also include the values of A and B described above.

The reference information may be stored in the memory 120. The relation between the phase values and the tilt angles of the object indicated by the reference information may be put in a database and stored in the memory 120 through measurement and calculation.

The processor 110 may derive the angle of the surface of the object 3 by deriving the phase values of the reflected lights based on the light quantity values and comparing the derived phase values of the reflected lights and the reference information acquired from the memory 120.

Figure 8:
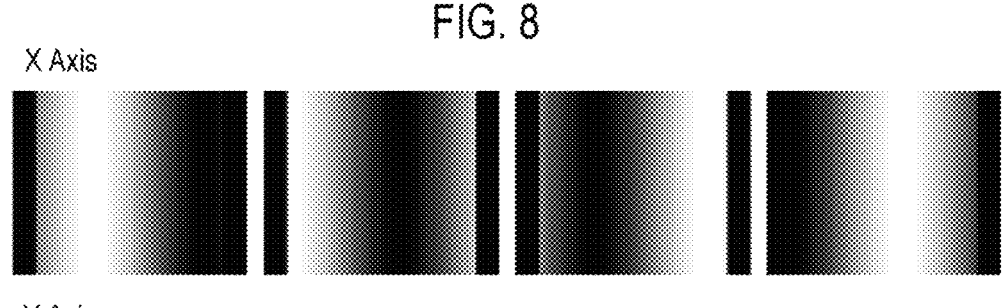
FIG. 8 shows the directions of patterns of structured light according to an embodiment of the present disclosure.
Figure 8:
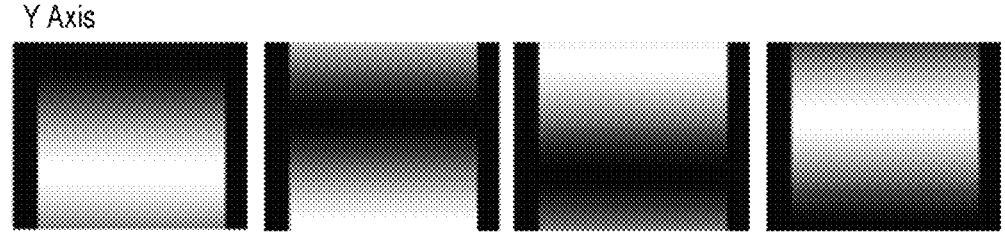
Figure 8:
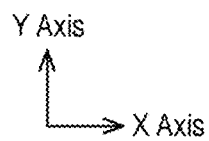

FIG. 8 shows the directions of patterns of structured lights according to an embodiment of the present disclosure. According to an embodiment, the structured-light source 130 may be implemented by a rectangular LCoS. Depending on the phase range of each bucket, the light beams radiated by the point light sources of the LCoS may have different brightness distributions, and thus a pattern may be formed.

When the axis corresponding to one side of the rectangular LCoS is the X axis and the axis, which corresponds to another side and is perpendicular to the X axis, is the Y axis, the pattern of the structured lights may be formed in the X-axis direction or the Y-axis direction. In an embodiment, each of the plurality of structured lights may have a pattern in the X-axis direction or in the Y-axis direction that is perpendicular to the X axis. In an embodiment, the pattern directions of the structured lights may be set differently for each bucket. In an embodiment, by using a plurality of patterns formed in the respective axial directions, it is possible to reduce errors in the angle measurement of the surface of an object.

Figure 9:
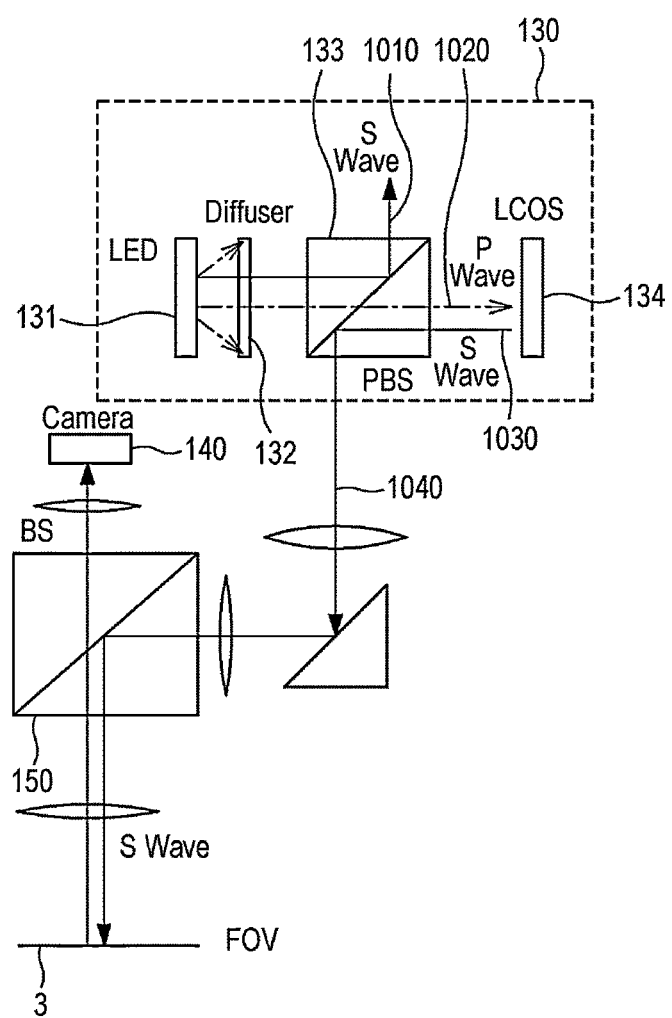
FIG. 9 illustrates the configuration of the structured-light source 130 according to an embodiment of the present disclosure.

FIG. 9 illustrates the configuration of the structured-light source 130 according to an embodiment of the present disclosure. The above-described patterns of the structured lights may be formed through various methods. According to an embodiment, the patterns of the structured lights may be formed through a digital method or through an analog method. The digital method may be a liquid crystal transmission method using a Liquid Crystal Display (LCD), a liquid crystal reflection method using Liquid Crystal on Silicon (LCoS), a mirror reflection using a Digital Micromirror Device (DMD), or a mirror reflection method using Digital Light Processing (DLP). In the analog method, a pattern may be formed using patterns such as a periodic pattern, a gradient pattern, and a lattice pattern.

The structured-light source 130 may also be implemented in various manners depending on a method of forming a pattern of structured light. As an example, an embodiment of the structured-light source 130 configured to form a pattern of structured light using LCoS will be described below.

In an embodiment using LCoS, the structured-light source 130 may include a light source 131, a diffusion plate 132, a second beam splitter 133, and/or a pattern generator 134. In an embodiment, at least one of these components of the structured-light source 130 may be omitted, or another component may be added to the structured-light source 130. Here, the pattern generator 134 may be implemented with the LCoS described above.

The light source 131 is able to radiate an illumination light. The illumination light is light having no pattern, and may include a horizontally polarized light and/or a vertically polarized light. The horizontally polarized light is a polarized light in which the vibration direction is parallel to the radiation direction, and may be referred to as P-wave or a first polarized light. The vertically polarized light is a polarized light in which the vibration direction is perpendicular to the radiation direction, and may be referred to as S-wave or a second polarized light. The light source 131 may be implemented by an LED. The diffusion plate 132 is able to diffuse the illumination light from the light source 131.

The second beam splitter 133 may adjust the optical path by receiving the illumination light from the diffuser plate 132. The second beam splitter 133 may transmit the first polarized light and reflect the second polarized light. Specifically, the second beam splitter 133 may transmit the first polarized light of the illumination light (1020) so as to direct the first polarized light to the pattern generator 134. Further, the second beam splitter 133 may reflect the second polarized light of the illumination light (1010). The reflected second polarized light (1010) may not be used in generating a structured light. The second beam splitter 133 may be implemented by a Polarizing Beam Splitter (PBS).

The pattern generator 134 may receive the first polarized light of the irradiated light and reflect a part of the received first polarized light as the first polarized light, and may convert another part of the received first polarized light into a second polarized light and reflect the second polarized light. The pattern generator 134 may have a plurality of elements. When an element is turned off, the corresponding element may reflect the received first polarized light (1020) as it is in the form of a first polarized light (not illustrated). When an element is turned on, the corresponding element may convert the received first polarized light (1020) into a second polarized light (1030), and reflect the converted second polarized light (1030). By causing each element to be turned on/off, the pattern generator 134 may generate a pattern.

The second beam splitter 133 may transmit the first polarized light (not illustrated), reflected and delivered to the second beam splitter 133, as it is. This first polarized light (not illustrated) may not form a structured light (1040). The part corresponding to the unused first polarized light may correspond to the dark portion of the structured light (1040). The second beam splitter 133 may reflect the second polarized light (1030) reflected and delivered to the second beam splitter 133. The second polarized light (1030) may be used to form a bright portion of the structured light (1040). The generated structured light may be delivered to the first beam splitter 150 described above. The structured light generated according to the embodiment may be delivered to the first beam splitter 150 through an additional mirror or the like.

FIG. 10 is a flowchart illustrating an embodiment of an inspection method that may be performed using an inspection apparatus 10 according to the present disclosure. Although respective steps of the method or algorithm according to the present disclosure are illustrated in a sequential order in the illustrated flow chart, the respective steps may be performed in an order in which the steps may optionally be combined by the present disclosure, in addition to being performed sequentially. The description with reference to this flowchart is not intended to preclude a change or modification to the method or algorithm, and does not mean that any step is necessary or desirable. In an embodiment, at least some of the steps may be performed in parallel, repetitively, or heuristically. In an embodiment, at least some of the steps may be omitted, or other steps may be added.

The inspection apparatus 10 according to the present disclosure may perform an inspection method according to various embodiments of the present disclosure in measuring the tilt angle of the object 3 with respect to the reference plane. An inspection method according to an embodiment of the present disclosure may include: sequentially radiating each of a plurality of structured lights having one phase range (S100); adjusting optical paths of light beams corresponding to phases of the phase range (S200); capturing a plurality of reflected lights generated by the plurality of structured lights being reflected from the partial region (S300); acquiring a light quantity value of each of the plurality of reflected lights (S400); and deriving the angle of the surface of the object based on the light quantity value (S500).

In step S100, the structured-light source 130 of the inspection apparatus 10 may sequentially radiate a plurality of structured lights having one phase range. In step S200, the at least one lens of the inspection apparatus 10 may adjust the optical path of each of the plurality of structured lights. Specifically, the at least one lens may adjust the optical paths of light beams corresponding to phases of the phase range such that a light beam corresponding to one phase of the above-mentioned predetermined phase range arrives at each point of the partial region on the surface of the object 3. Similarly, the at least one lens may, for each of the plurality of structured lights, adjust the optical path of a light beam corresponding to each of the phases of the above-mentioned phase range.

In step S300, the image sensor 140 of the inspection apparatus 10 may capture a plurality of reflected lights generated by the plurality of structured lights being reflected from the above-described partial region of the object 3. In step S400, the processor 110 of the inspection apparatus 10 may acquire a light quantity value for each of the plurality of reflected lights from the image sensor 140. In step S500, the processor 110 may derive the angle of the surface of the object 3 based on the acquired light quantity value.

In an embodiment, step S500 of deriving the angle of the surface of the object based on the light quantity value may include deriving, by the processor 110, the phase value of each of the plurality of reflected lights based on the light quantity value, and deriving the angle of the surface of the object based on the derived phase value and the reference information. The reference information is as described above.

In an embodiment, the phase range may be set to a value other than an integer multiple of the period of the structured lights. In one embodiment, periods of the plurality of structured lights may be the same. In an embodiment, the above-described phase range may be set to be greater than the phase range corresponding to (N+1/2) period of the structured lights and smaller than the phase range corresponding to (N+1) period of the structured lights. N may be a natural number.

In an embodiment, the light quantity value of a reflected light may be determined based on a light quantity value of each of the plurality of reflected lights passing through the second diaphragm 170 and being captured by the image sensor 140. Each of the plurality of reflected lights are generated by the plurality of structured lights from the structured-light source 130, passing through the first diaphragm 160 and being reflected from the surface of the object 3. That is, as described above, the structured lights, radiated from the structured-light source 130 may generate the reflected lights by passing through the first diaphragm 160 and by being reflected from the surface of the object 3. A part of the reflected light passes through the second diaphragm 170. The light quantity of the reflected light passing through the second diaphragm 170 may vary depending on the angle of the surface of the object 3.

In an embodiment, a light beam having a light quantity corresponding to an average light quantity of each of the plurality of structured lights corresponding to the above-described phase range may arrive at each point of the above-described partial region on the surface of the object 3.

In an embodiment, each of the plurality of structured lights may be generated by phase-shifting one structured light by a predetermined phase interval.

Various embodiments of the present disclosure may be implemented as software in a machine-readable storage medium. The software may be software for implementing various embodiments of the present disclosure described above. The software may be inferred from various embodiments of the present disclosure by programmers of the technical field to which this disclosure belongs. For example, the software may be a program including machine-readable commands (e.g., codes or code segments). The machine is an apparatus operable according to an instruction called from a storage medium, and may be, for example, a computer. In an embodiment, the machine may be the inspection apparatus 10 according to embodiments of the present disclosure. In an embodiment, a processor of the machine may execute the called commands so as to cause the components of the machine to perform functions corresponding to the commands. In an embodiment, the processor may be the processor 110 according to embodiments of the present disclosure. The term "storage medium" may mean all kinds of recording mediums, where machine-readable data is stored. The storage medium may include, for example, ROM, RAM, CD-ROM, magnetic tape, floppy disk, optical data storage, and the like. In an embodiment, the storage medium may be the memory 120. In an embodiment, the storage medium may be implemented in the form of being distributed on a networked computer systems or the like. The software may be distributed and stored in computer systems or the like so as to be executed. The storage medium may be a non-transitory storage medium. The term "non-transitory storage medium" means a tangible medium regardless of whether data is stored therein semi-permanently or temporarily, and does not include a signal propagated in a transitory manner.

Although the technical idea of the present disclosure has been described above by way of various embodiments, the technical scope of the present disclosure covers various substitutions, modifications, and changes that can be made by a person ordinarily skilled in the technical field to which the present disclosure belongs. It should also be understood that such substitutions, modifications and changes are intended to fall within the scope of the present disclosure that is defined in the accompanying claims.

What is claimed is:

1. An apparatus comprising:
   a structured-light source configured to sequentially radiate a plurality of structured lights having a predetermined phase range;
   at least one lens configured to adjust optical paths of the plurality of structured lights such that each light beam of the plurality of structured lights corresponding to each phase of the phase range is divided into and incident on each point of a region on an object, rather than being focused at one point of the region on the object;
   an image sensor configured to capture a plurality of reflected lights generated by the plurality of structured lights reflected from the region;
   a memory that stores reference information on an inclination of the region; and
   a processor configured to:
   acquire light quantity values of the plurality of reflected lights from the image sensor; and
   derive an angle of the region with respect to a reference plane based on the light quantity values and the reference information.

2. The apparatus of claim 1, wherein the reference information indicates a relation between the angle of the region and the light quantity values of the plurality of reflected lights.

3. The apparatus of claim 1, wherein the phase range is not an integer multiple of a period of the plurality of structured lights.

4. The apparatus of claim 1, wherein the plurality of structured lights are generated by phase-shifting one structured light by a predetermined phase interval.

5. The apparatus of claim 1, wherein the plurality of structured lights have the same predetermined phase range.

6. A method, comprising:
   sequentially radiating, by a structured-light source, a plurality of structured lights having a predetermined phase range;
   adjusting, by at least one lens, optical paths of the plurality of structured lights such that each light beam of the plurality of structured lights corresponding to each phase of the phase range is divided into and incident on each point of a region on an object, rather than being focused at one point of the region on the object;
   capturing, by an image sensor, a plurality of reflected lights generated by the plurality of structured lights reflected from the region;

acquiring, by a processor, light quantity values of the plurality of reflected lights from the image sensor; and deriving, by the processor, an angle of the region with respect to a reference plane based on the light quantity values and reference information on an inclination of the region stored in a memory.

7. The method of claim 6, wherein the reference information indicates a relation between the angle of the region and the light quantity values of the plurality of reflected lights.

8. The method of claim 6, wherein the phase range is not an integer multiple of a period of the plurality of structured lights.

9. The method of claim 6, wherein the plurality of structured lights are generated by phase-shifting one structured light by a predetermined phase interval.

10. The method of claim 6, wherein the plurality of structured lights have the same predetermined phase range.

* * * * *